United States Patent [19]

Montemurro

[11] 4,128,037

[45] Dec. 5, 1978

[54] APPARATUS FOR DISPLAYING PRACTICE LESSONS FOR DRUMMERS

[76] Inventor: Nicholas J. Montemurro, 128 Sanford Ave., Lyndhurst, N.J. 07071

[21] Appl. No.: 811,635

[22] Filed: Jun. 30, 1977

[51] Int. Cl.² ........................................... G09B 15/02
[52] U.S. Cl. .................................. 84/476; 84/483 R
[58] Field of Search .............. 84/471, 476, 472, 483 R

[56] References Cited

U.S. PATENT DOCUMENTS

| 181,827 | 9/1876 | Eckhardt | 84/476 |
|---|---|---|---|
| 395,635 | 1/1889 | Schemmel | 84/476 |
| 3,817,145 | 6/1974 | Cohen | 84/471 |

Primary Examiner—Lawrence R. Franklin
Attorney, Agent, or Firm—Charles E. Baxley

[57] ABSTRACT

A device for teaching and/or practicing the art of drumming comprises an array of tiles disposed within a frame. The tiles bear in each case indicia to indicate a type of percussive stroke, the component or components of a set of trap drums with which said strokes are to be made, and if desired, an indication of how many of such strokes are to be made in sequence. The tiles may be arranged in any desired order by the student or instructor so as to provide a record readily readable by the drummer, for practice in achieving a variety of musical or percussive effects.

5 Claims, 9 Drawing Figures

APPARATUS FOR DISPLAYING PRACTICE LESSONS FOR DRUMMERS

BACKGROUND OF THE INVENTION

The customary method of notation with respect to drum scores is to use conventional ruled music paper, and provide thereon notation similar to conventional musical notation, except that the conventional oval body of each note is ordinarily replaced by an "X" or the like to indicate that no particular pitch is intended, other than the normal pitch inherent in the construction of the drum. When a variety of percussion instruments are to be played by a single player, for example a trap drummer, an indication of which of the percussion instruments involved is to be employed for any particular stroke may be provided by providing multiple staves, one for each of the instruments, or by written directions on a single stave. It should be noted at this point that the present discussion excludes from consideration those percussion instruments which are selectively tunable such as orchestral tympani, glockenspiels, xylophones, pianos and the like.

These conventional methods of notation have proven entirely suitable for the scoring of individual selections such as band music or orchestral selections. However, they suffer from certain disadvantages. In particular, each such selection requires the provision of a separate sheet of notation, which is wasteful when applied to practice lessons, wherein each rhythmic pattern or percussive effect to be learned must either be purchased as such, or written down manually on music paper by the student or his instructor. Moreover, reliance on purchased notation or manually-recorded notation interferes with the flexibility of allowing the student, or the instructor, to readily rearrange the notation, so as to experiment with novel rhythmic and percussive effects.

OBJECTS OF THE INVENTION

An object of this invention, therefore is to provide improved methods and apparatus for setting down notation for the playing of percussion instruments in quasi-permanent form.

Another object is to provide such a method, which is economical in terms of materials and labor expended.

Still another object is to provide methods and apparatus as aforesaid, which provides a high degree of flexibility in the arrangement and re-arrangement of such notation.

Other objects and advantages will become apparent from the following more complete description and claims, and the accompanying drawings.

BRIEF STATEMENT OF THE INVENTION

This invention relates to improved methods and apparatus for displaying notation for the use of a drummer in achieving a variety of rhythmic and musical effects.

In a particularly desirable embodiment, this invention contemplates apparatus for scoring and displaying indicia in the nature of notation for the playing of a percussion instrument such as a drum or the like, comprising in combination:

a frame describing an enclosed area, a plurality of individual tiles disposable within said frame so as to substantially fill said area in tesselated array, at least some of said tiles bearing indicia relating to the playing of said percussion instrument, said tiles being interchangeable as to their respective positions in said tesselated array, said indicia and said respective positions cooperating to display information constituting a rhythmic pattern to be played upon said percussion instruments.

In another particularly desirable embodiment this invention contemplates a method for scoring and displaying indicia in the nature of notation for the playing of a percussion instrument such as a drum or the like comprising in combination the steps of:

providing a frame defining an enclosed area, providing a plurality of individual tiles disposable within said frame so as to substantially fill said area in tesselated array, at least some of said tiles bearing indicia relating to the playing of said percussion instrument, and arranging said tiles within said tesselated array in such manner that said indicia and the respective positions of said tiles cooperate to display information constituting a rhythmic pattern to be played upon said percussion instrument.

BRIEF DESCRIPTION OF FIGURES

In the accompanying drawings, in which the same reference numerals have the same significance throughout:

FIG. 5 bears similar indicia calling for the execution of a stroke having a value of a quarter note.

Figure 6:
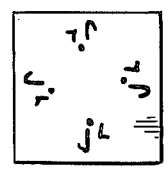
Figure 7:
Figure 8:
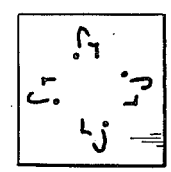

Similarly FIG. 6 calls for an eighth note rest followed by an eighth note stroke, FIG. 7 calls for a quarter note rest and FIG. 8 calls for an eighth note stroke followed by an eighth note rest.

Obviously, similar adaptations of conventional musical notation may be employed to indicate 16th and 32nd note strokes and rests, as well as triplets, quadruplets, etc.

Figure 4:
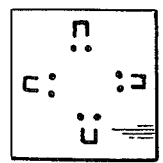
FIGS. 4–8 are a series of plan views of individual indicia bearing tiles encoded with indicia analagous to conventional musical notation, FIG. 4 calling for two strokes each having a value corresponding that of an eighth note.
Figure 9:
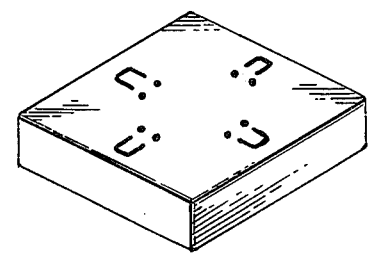

FIG. 9 is a perspective view of the tile according to FIG. 4.

PREFERRED EMBODIMENTS OF THE INVENTION

Figure 1:
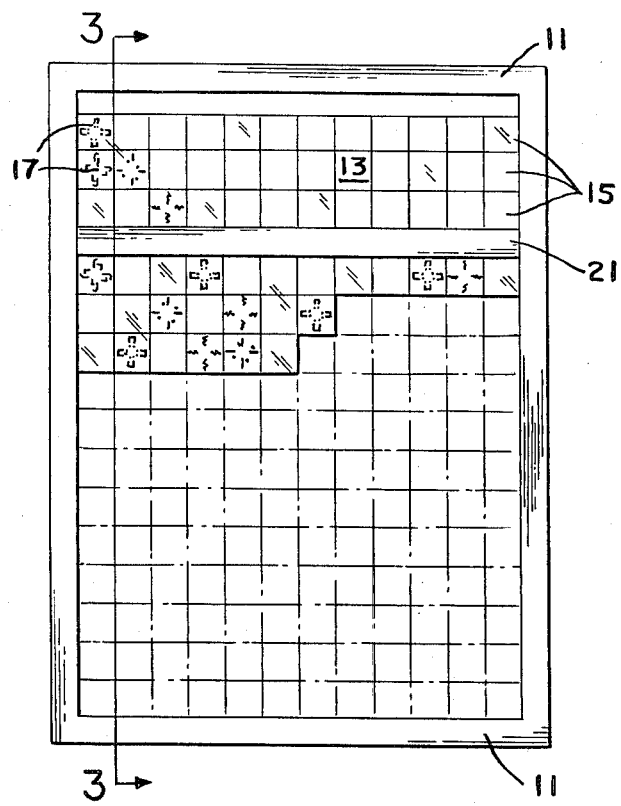
FIG. 1 is a plan view of the apparatus of this invention.
Figure 2:
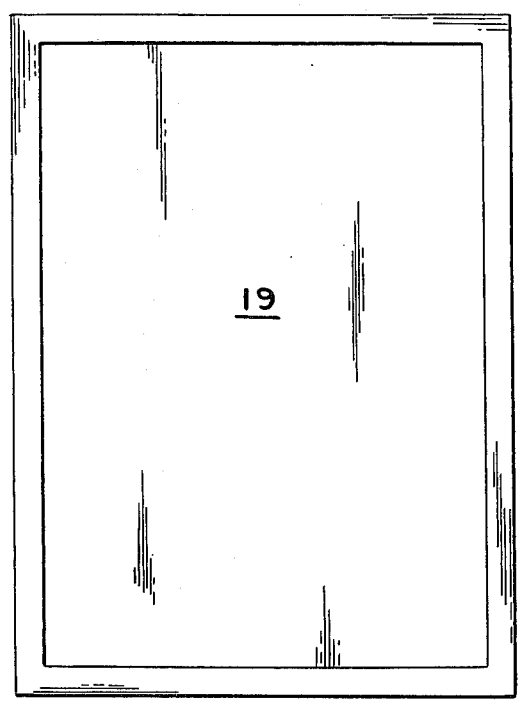
FIG. 2 is a plan view of another form of apparatus according to this invention in which the dividing portion of the frame of the apparatus of FIG. 1 is omitted, and in which the frame 11 is provided with a planar base member 19.
Figure 3:
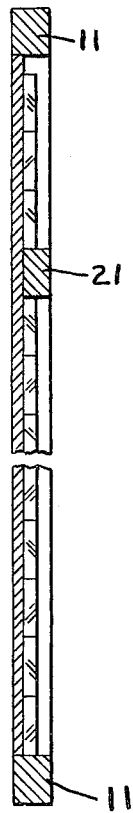
FIG. 3 is a sectional view of the apparatus according to FIG. 1, taken along the line 3—3 of FIG. 1.

One preferred embodiment of the invention is illustrated in FIGS. 1 and 3 wherein, in addition to the frame and the tiles arranged therein there is further provided a partition 21 dividing the area enclosed by frame 11 into two fields, each capable of accommodating a tesselated array of tiles 15 and 17. This embodiment of the invention is particularly convenient when it is desired to display simultaneously two rhythmic patterns, for example, one for execution by the feet using a bass drum pedal or the like and the other by the hands, for example, in beating a snare drum. In the event it is desired to display notation applying to additional percussion instruments such as cymbals, blocks, etc., additional partitions similar to partition 21 may be employed to further sub-divide the area enclosed within frame 11, or the use of such additional partitions may be dispensed with, instead simply arranging the tiles in various preselected areas, for example, in successive bands across the lower, larger, field as depicted in FIG. 1.

The planar base 19 is not necessarily essential to the combination according to this invention, as the tiles within frame 11 may be supported directly on a table, music stand, or the like. However, the use of such a base is highly advantageous in that it permits the tile display to be picked up and moved about without disturbing the arrangement of the tiles in the apparatus. Similarly, it is frequently desirable, although not essential, to provide a transparent cover in the form of a sheet of, e.g., Plexiglass methylmethacrylate polymer (not shown), to prevent the tiles from being disarranged or falling out of the apparatus entirely in case the latter should be accidentally jogged or jolted.

Blank tiles bearing no indicia thereon are provided in sufficient number to substantially fill the space within the frame which is not occupied by the indicia bearing tiles. In addition, they may be used in place of tiles indicating rests, to designate intervals during which the instrument in question is not intended to be played.

Preferably, each tile is of the same size as the others, and designates in each case an equivalent time interval, as is the case with the tiles illustrated in FIGS. 4 through 8.

Figure 5:
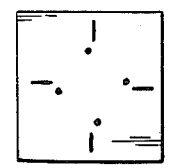

Preferably also, and as also illustrated in FIGS. 4 through 8 the tiles are square, and each side of the tile is marked with the same indicia as the other three sides, the positions being suitably rotated. This arrangement leads to the possibility of developing novel rhythmic patterns thus, reading the indicia as illustrated in FIGS. 4-6 from left to right across the top, the notation calls for two eighth note strokes, one quarter note stroke, an eighth note rest and an eighth note stroke. If, however, this series of tiles is inverted, it calls for an entirely different rhythmic pattern consisting of an eighth note rest, an eighth note stroke, a quarter note stroke and two eighth note strokes. By the same token, if an array of tiles displayed within frame 11 is rotated 90° in either direction, still further rhythmic patterns are generated.

As a matter of convenience, the movable elements disposed within the frame have been designated by the term "tiles". It is to be understood that this term is to be constructed broadly, by analogy to the wooden "tiles" used in board games such as "Scrabble", the ivory "tiles" commonly used in playing mah-jongg, and asbestos or vinyl "tile" flooring, for example, to designate a planar rectangular (preferably square) element generally, whether made of ceramic material or any other appropriate material.

The principal use of this invention is for practice purposes, wherein the instructor or the student arranges the tiles to denote a specific rhythmic pattern and by repetition of the playing of the pattern thus displayed, commits it to memory and develops facility in using it. Once the pattern has been mastered, the tiles may be rearranged to denote another rhythmic pattern and the process repeated. Another application of the invention is to record and preserve such patterns, for example, by rearranging the tiles and playing the pattern called for by the indicia displayed until a desired result is achieved, and photographing or otherwise copying the final arrangement for subsequent use.

While this invention has been described with respect to certain embodiments and illustrated by means of certain drawings, these are illustrative only, as many alternatives and equivalents will readily occur to those skilled in the art without departing from the spirit or proper scope of this invention. The invention is therefore not to be construed as limited except as set forth in the appended claims.

I claim:

1. Apparatus for scoring and displaying indicia in the nature of notation for the playing of a percussion instrument such as a drum or the like, comprising in combinating:

a frame defining an enclosed area and also defining a generally planar base
   a plurality of tiles, each of said tiles having in said base plane the same general dimensions as the other tiles in said plurality, said tiles being disposable within said frame so as to substantially fill said area in tesselated array,
   at least some of said tiles bearing indicia relating to the playing of said percussion instrument,
   said tiles being interchangeable as to their respective positions in said tesselated array,
   said indicia and said respective positions cooperating to display information constituting a rhythmic pattern to be played on said percussion instrument, and at least some of said tiles being provided with a plurality of indicia associated with a plurality of sides of said tiles, said indicia associated with any one of said tile sides of any respective tile being the same as the indicia associated with each of the other of the sides of said respective tile thus providing for said tiles to be viewed and read in a plurality of angular directions.

2. Apparatus as defined in claim 1, further comprising a planar backing member for supporting said tiles within said frame.

3. Apparatus as defined in claim 1, further comprising at least one partition member dividing said area into a plurality of fields.

4. A method for scoring and displaying indicia in the nature of notation for the playing of a percussion instrument such as a drum or the like, comprising in combination the steps of:

providing a frame defining an enclosed area,
   providing a plurality of polygonal tiles of generally uniform shape in the plane of said enclosed area disposable within said frame so as to substantially fill said area in a tesselated array,
   at least some of said tiles bearing a plurality of indicia relating to the playing of said percussion instrument, each indicia in said plurality for a respective one of said tiles being associated with one of the sides of said respective tile, said indicia associated with said one side also being the same as the indicia associated with each of the other sides of said respective tile,
   arranging said tiles within said frame in such manner that the respective positions of said tiles cooperate with said indicia to define a rhythmic pattern to be played on said percussion instrument, and viewing and reading said tiles arranged within said frame in a plurality of angular directions.

5. A method according to claim 4, comprising the further step of making a visible record of said tiles arranged within said frame.

* * * * *